United States Patent [19]
Yasumoto

[11] Patent Number: 6,023,346
[45] Date of Patent: Feb. 8, 2000

[54] COMMUNICATION TERMINAL DEVICE

[75] Inventor: Hiroyuki Yasumoto, Kagamigahara, Japan

[73] Assignee: Murata Kikai Kabushiki Kaisha, Kyoto, Japan

[21] Appl. No.: 08/987,755

[22] Filed: Dec. 9, 1997

[30] Foreign Application Priority Data

Dec. 11, 1996 [JP] Japan ..................................... 8-330691

[51] Int. Cl.[7] .................................................. H04N 1/00
[52] U.S. Cl. ................ 358/434; 379/100.01; 379/100.06
[58] Field of Search ......................... 379/100.01, 100.06; 358/434, 440, 437, 405, 436, 438

[56] References Cited

U.S. PATENT DOCUMENTS

| | | | |
|---|---|---|---|
| 4,742,536 | 5/1988 | Dewenter | 379/97 |
| 4,987,586 | 1/1991 | Gross | 379/93 |
| 5,521,974 | 5/1996 | Hayashi | 379/381 |
| 5,625,679 | 4/1997 | Gutzmer | 379/99 |
| 5,915,002 | 6/1999 | Shimosako | 379/93.07 |

*Primary Examiner*—Jerome Grant II
*Attorney, Agent, or Firm*—Armstrong Westerman Hattori McLeland & Naughton

[57] ABSTRACT

In the present invention, a facsimile device is connected to a personal computer without the use of a special interface. The facsimile device can then be used as either a printer or a scanner for the personal computer without the need for complicated operation to switch between the printer mode and the scanner mode. Data transfer is carried out between the facsimile device and the personal computer using a facsimile communication control procedure.

3 Claims, 4 Drawing Sheets

COMMUNICATION TERMINAL DEVICE

BACKGROUND OF THE INVENTION

1. Technical Field

The present invention relates to a communication terminal device, more particularly to a communication terminal device such as a facsimile that can function as a scanner or a printer for an external terminal device such as a computer that is connected to the communication terminal device by means of a communication link (such as a cable, infrared or radio waves).

2. Background Art

Facsimile devices have conventionally been one of the communication terminal devices used for receiving/transmitting image data and they have spread to the common household. Recently, other multifunctional terminal devices such as personal computers ("PCs") have also been developed which can be used for a variety of purposes when used together.

As use of facsimile devices and PCs have spread, facsimile devices that can be connected to PCs (the PCs function as external terminal devices of the facsimile device) and can be used together with the PCs have been developed.

More specifically, a facsimile device of this type can function as a scanner of an associated PC whereby the image data scanned by the facsimile device is transmitted to the PC ("PC scanning"). The PC can then process or modify the received image data. Conversely, the facsimile device can function as a printer of the associated PC when the image data created at the PC is transmitted to the facsimile device ("PC printing"). The facsimile device can then print out the received image data on its recording paper that is set inside it.

However, in the facsimile device described above, manual operation such as picking up a built-in handset for creating an "off-hook" state and the pushing of start keys is required when PC scanning is to be carried out. In this case, either some predetermined manual operation is also needed on the PC side because data reception has to be conducted manually, or the PC has to conduct polling reception in which it transmits a transmission command signal and then receives the scanned image data as the response to the signal.

In addition, when PC printing is to be carried out, the reception at the facsimile device of data from the PC must be conducted manually the same way data is transmitted from the facsimile device in the PC scanning. Similarly, the PC side must transmit the data manually the same way it receives data in the PC scanning.

SUMMARY OF THE INVENTION

In order to solve the problems described above, it is an object of the present invention to propose a communication terminal device that is easy to operated and can function as a scanner or a printer of an external terminal device.

The communication terminal device is connected to external terminal devices by way of a communication link. As a first aspect of the present invention, the communication terminal device starts the data reception process for receiving data from the external device when it receives a calling signal by way of the communication link, and the communication terminal device starts the data transmission process for transmitting data to the external device when it receives a reception response signal by way of the communication link.

According to a first aspect of the present invention, when the communication terminal device is a facsimile device and it is connected to a PC, the communication terminal device starts the PC printing process when it receives a calling signal and it starts the PC scanning operation when it receives a reception response signal. Therefore, only PC side operation is required in order to make the facsimile device perform printing or scanning.

Herein, the calling signal includes a CNG (calling tone) that is transmitted/received according to a facsimile communication procedure. The reception response signal includes a CED (called station identification signal), a DIS (Digital Identification Signal), and a NSF (Non-Standard Facilities Signal).

According to a second aspect of the present invention, when the data transmission process is started, the facsimile device is automatically connected to the external terminal device by means of a ringing signal transmitted over the communication link. Thus, the PC scanning process can be implemented by means of a call from the facsimile device side.

According to a third aspect of the present invention, a communication line is further connected and when a ringing signal is detected over this communication line, a pseudo ringing signal is generated in the communication terminal device after the connection of the communication line and the data transmission processing is initiated. The ringing signal sent through the communication link to the external terminal device is a pseudo ringing signal.

A pseudo ringing signal is generated when a ringing signal is received from another communication terminal device over a communication line (such as a telephone line) and after the automatic connection has been made. The pseudo ringing signal is to indicate that a response such as picking up the built-in handset should be made.

In the prior art, a facsimile device is generally connected to its affiliated personal computer by way of an interface part. That is, an interface part must always be provided to the facsimile device in order to connecting it to the personal computer. In, addition, software for communicating data through the interface part is also required. The communication terminal device according to the present invention, on the contrary, does not require such an interface part or software but only requires the PC modem of the personal computer to be connected to the external telephone terminal. Further, the communication terminal device of the present invention can conduct data communication according to ordinary facsimile communication procedures.

BRIEF DESCRIPTION OF THE ACCOMPANYING DRAWINGS

DETAILED DESCRIPTION OF THE PREFERRED EMBODIMENTS

Now, a preferred embodiment of the present invention will be described with reference to the accompanying drawings.

Figure 1:
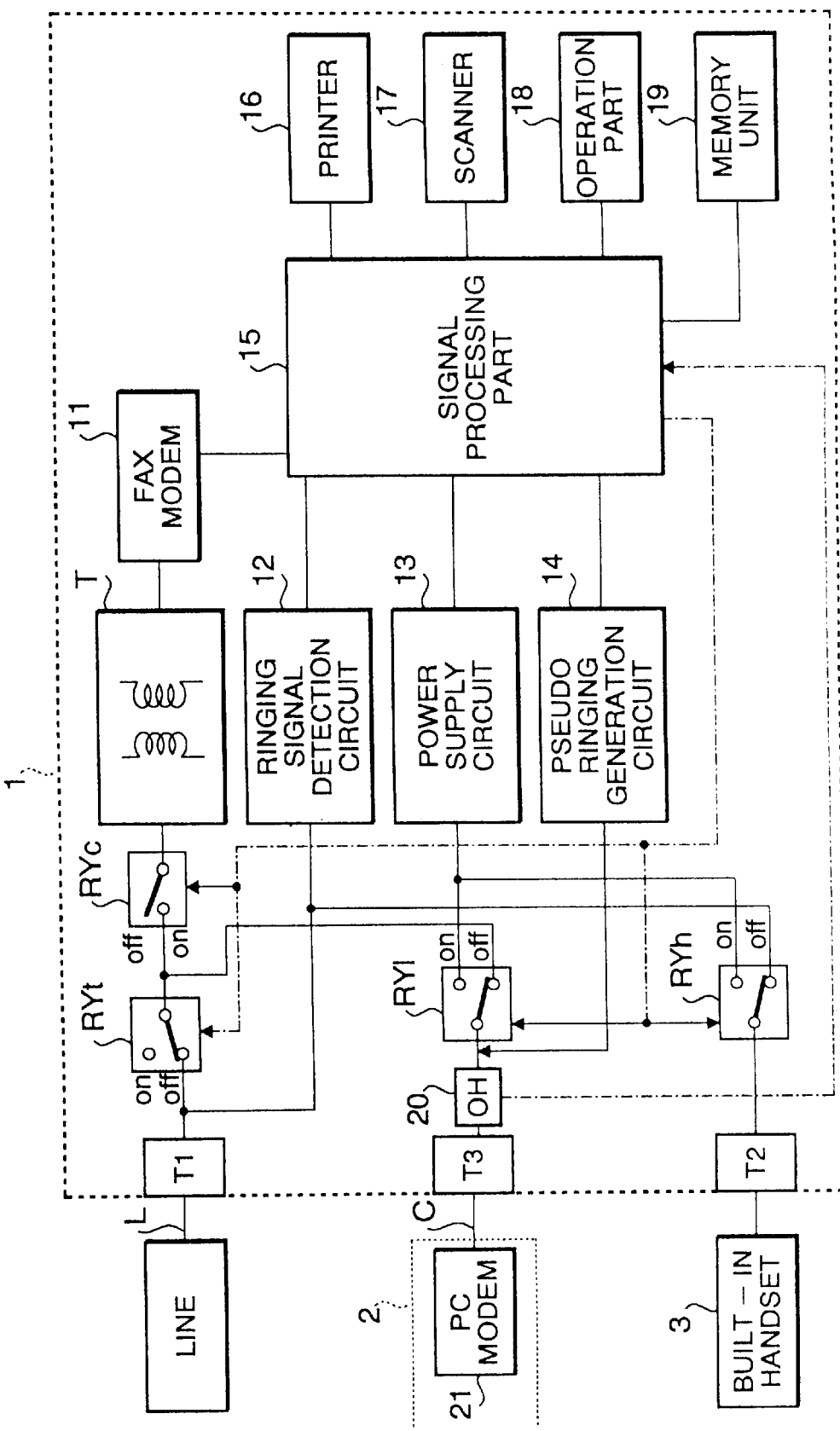
FIG. 1 is a block diagram showing an example of the structure of the main part of a communication terminal device of the present invention.
Figure 2:
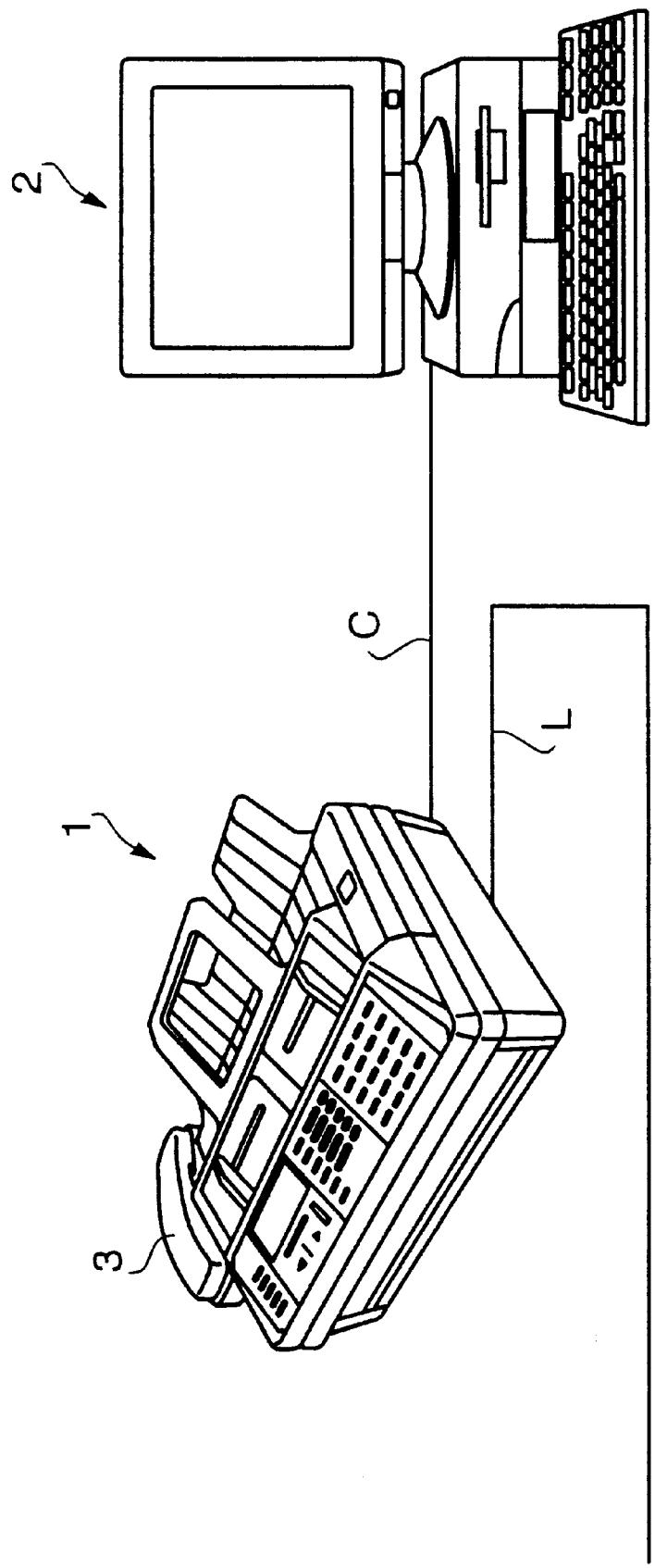
FIG. 2 is a diagram showing an example of the structure of a communication system provided with the communication terminal device of the present invention.

FIG. 1 is a block diagram showing an example of the basic structure of a communication terminal device of the present invention. FIG. 2 is a schematic structural diagram showing a communication system provided with the communication terminal device of FIG. 1.

FIG. 1 shows the case where the communication terminal device of the present invention is a facsimile device 1. A line L connecting a telephone network, facsimile communication network, computer communication network or the like is connected to a connection terminal T1 (the line terminal) of the facsimile device 1. A built-in handset 3 is connected to another connection terminal T2 (the first telephone terminal). In addition, a personal computer (PC) 2 is connected as an external terminal device to another connection terminal T3 (the second telephone terminal) over communication link C (such as a cable, infrared and radio wave). It should be noted that a second handset would be connected to the second telephone terminal T3 in the conventional device described above.

In the arrangement described above, the facsimile device 1 can communicate with the line L or the PC 2 provided with a (PC) modem 21 by means of ordinary facsimile communication procedures such as G3, without switching the connection terminals T1, T3. Further, data communication with the line L by way of the facsimile device 1 is possible at the PC2.

In FIG. 1, the facsimile device 1 further includes a fax modem 11 that generates and detects protocol signals and that modulates image data to be transmitted and demodulates received image data in order to run the facsimile communication program, a ringing signal detector 12 that detects ringing signals (16 Hz) from the line L, a power supply 13 that supplies direct voltage (DC 24V) to the connection terminals T2 and T3, and a pseudo ringing generation circuit 14 that creates a pseudo ringing signals when the ringing signals from the line L which is a communication circuit is detected at the ringing signal detector 12 after the line has been connected.

The pseudo ringing generated by the pseudo ringing generation circuit 14 is rung as a ringing sound for a predetermined number of times (twice, for example) after the ringing signals are received through the line L, in order to urge response by the built-in handset 3 after the automatic reception. If no response is made after the pseudo ringing is rung the predetermined number of times, facsimile reception is automatically started by the fax modem 11.

The facsimile device 1 further includes various types of control relays for connecting the lines. A CML relay RYc connects fax modem 11 with the line L or the PC side. When CML relay RYc is made "ON" state, the fax modem 11 is connected to the line L or the PC 2 such that communication with the external communication terminal device or the PC 2 is enabled by way of a transformer T.

A T relay RYt connects the fax modem 11 or the PC 2 with the line L. When the T relay RYt is turned to "ON" state, the fax modem 11 or the PC 2 is disconnected from the line L and when the T relay RYt is turned to an "OFF" state, the fax modem 11 or the PC2 is connected to the line L.

An L relay RYl switches the connection of the PC 2 between the power supply 13 side and the line L or the fax modem 11 side. When the L relay RYl is in its "OFF" state, the PC2 is connected to the line L or the fax modem 11 side. When the L relay RYl is turned to an "ON" state, voltage is supplied to the PC 2 (the PC modem 21) from the power source 13.

An H relay RYh controls the switching of the connection of the built-in handset 3 between the power supply 13 and the line L. When the H relay RYh is in its "OFF" state, the built-in handset 3 is connected to the line L side. When the H relay RYh is turned to an "ON" state, voltage is supplied to the built-in handset 3 from the power source 13.

Each part of the facsimile device 1 described above is controlled by a signal processing part (not shown) that includes a CPU. The facsimile device 1 further includes: a printer 16 for printing the image data on the recording paper; a scanner 17 for scanning the document on the document guide or the like and converting it into image data; an operation part 18 that includes a display such as Liquid Crystal Display and various type of operation keys such as ten-keys; and a memory unit 19 that is provided with an image memory or the like for storing the image data.

Figure 3:
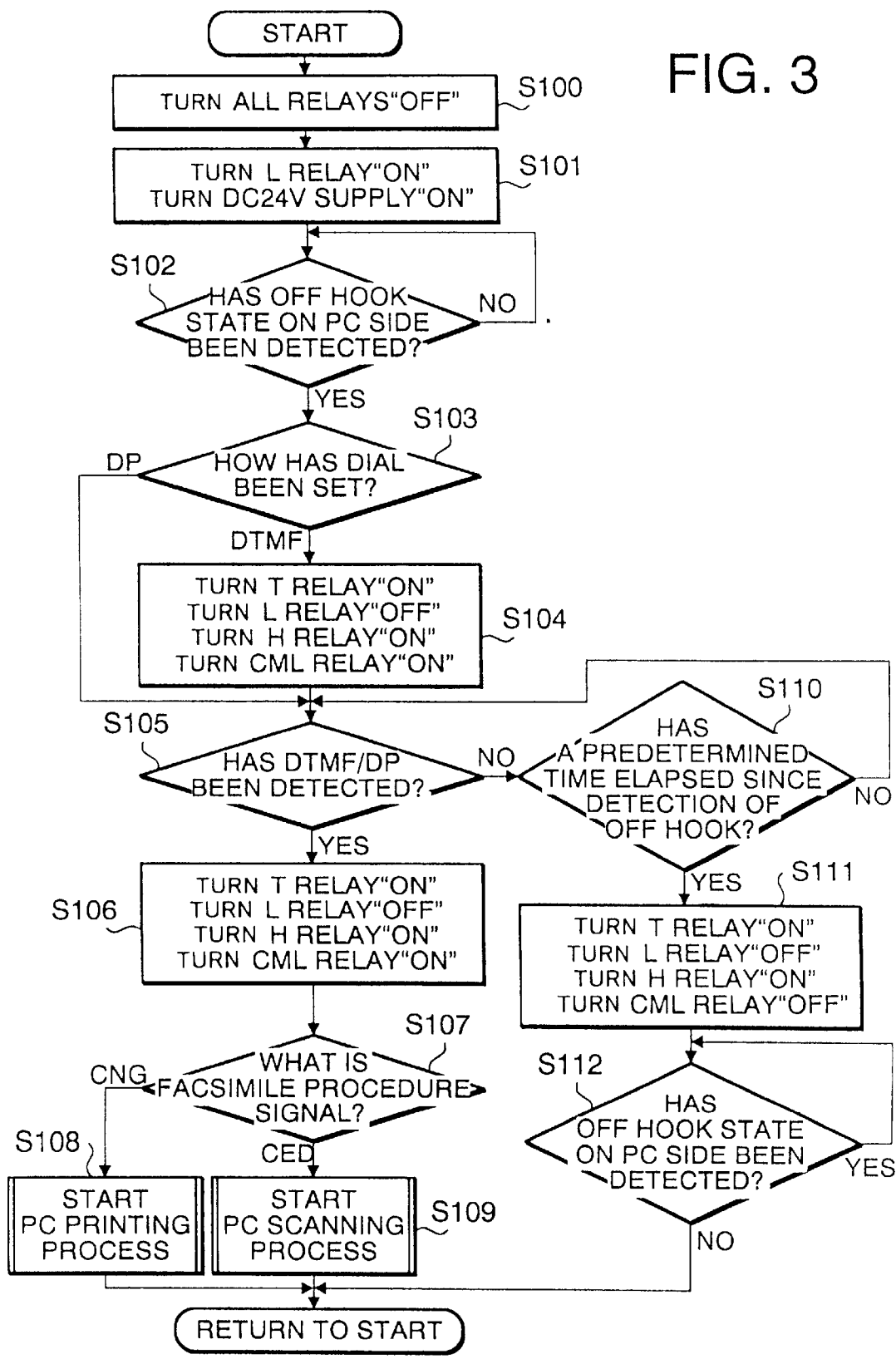
FIG. 3 is a flow chart showing an example of the basic operation of the communication terminal device of the present invention.

Arranged as described above, the facsimile device 1 can accomplish communication with the PC as well as with the line L. The basic operation of such communication is shown in the flow chart of FIG. 3.

When the device is waiting, the relays RYc, RYt, RYh are in an "OFF" state and the L relay RYl is in an "ON" state. In this state, the line L is disconnected from the PC 2 and the voltage (DC 24 V) is supplied to the PC side (the connection terminal T3 side) from the power supply 13 (S100, S101).

When power is supplied, the signal processing part 15 is able to determine that the calling operation from the PC 2 side should begin when the off hook detection circuit 20 detects that connection terminal T3 side is in an "Off hook" (energized) state (S102).

The signal processing part 15 then refers to a deal setting that has been preset in the facsimile device 1. If dial pulse (called "DP" hereinafter) is set as the dial setting, the L relay RYl is kept in an "ON" state and the power supply from the power supply circuit 13 is maintained such that the dial pulse can be detected by the off hook detection circuit 20. If tone dialing ("DTMF" or Dual Tone Multi Frequency) is set as the dial setting, the signal processing part 15 turns the T relay RYt to an "ON" state and disconnects the fax modem 11 from the line L such that the DTMF transmitted from the PC 2 is detected on the fax modem 11 side. Further, the signal processing part 15 turns the L relay RYl to an "OFF" state and turns the H relay RYh and the CML relay RYc to an "ON" state such that the fax modem 11 is connected to the PC modem 21 (S103, S104).

Next, when DTMF or DP from the PC2 is detected through the communication link C, the signal processing part 15 turns the T relay RYt to an "ON" state and disconnects the line L such that the L relay RYl is turned "OFF", the H relay RYh is turned "ON", the CML relay RYc is turned "ON" and thus communication becomes enabled between the fax modem 11 and the PC modem 21 (S105, S106).

Next, the facsimile procedure signals that are received over the communication link C are monitored. When CNG is received, the signal processing part 15 determines that the data is transmitted from the PC modem 21 of the PC 2. The signal processing part 15 then automatically starts PC printing and prints out the image data that is received by the fax modem 11 on the predetermined recording paper. Conversely, when CED is received, the signal processing part 15 determines that the data is to be received by the PC 2 side and automatically starts PC scanning. The scanned image data is transmitted from the fax modem 11 and is received by the PC modem 21. The PC 2 then displays the image data in the CRT display or the like (S107–S109).

The signal processing part 15 automatically starts PC printing when the fax modem 11 receives CNG, while the signal processing part 15 automatically starts PC scanning when the fax modem 11 receives CED. However, the present invention is not limited to this arrangement and some other arrangements are also possible. For example, the signal processing part 15 may be designed such that it initiates PC printing if the fax modem 11 does not receive any signal over a predetermined period (e.g. for 3 seconds) after the detection of DTMF or DP. Alternatively, the signal processing part 15 may be designed such that it starts PC scanning when the fax modem 11 receives any or all of CED, DIS, and NSF.

In short, in the present invention, the signal processing part 15 initiates the data reception process for receiving data from the external terminal device such as the PC 2 if the signal received over the communication link C is a calling signal like CNG. On the other hand, if the received signal is a receive response signal like CED, the signal processing part 15 starts data transmission process for transmitting data from the PC 2 to the facsimile device 1 regardless of whether or not transmission of CNG has occurred. Accordingly, the facsimile device 1 can conduct PC printing or PC scanning by very simple operation only on the PC2 side.

In addition, the operation for calling the line L from the PC 2 is also shown in the flow chart. When the line L is to be connected, if DTMF or DP is not detected for a predetermined period (e.g. for 5 seconds) after the detection of an "OFF hook" state (S102), the signal processing part 15 turns the T relay RYt to an "OFF" state such that the line L is connected to the L relay RYl. The signal processing part 15 then turns the L relay RYl "OFF", the H relay RYh "ON", and the CML relay RYc "OFF" such that the fax modem 11 is disconnected from the relay RYt and the PC modem 21 is connected to the line L by way of the L relay RYl and the T relay RYt, allowing the calling and thus communication from the PC2 to the line L. The signal processing part 15 maintains the state of each relay RYc, RYt, RYl and RYh until the "Off hook" state on the connection terminal T3 side is no longer detected (that is, until electric current no longer flows in the line) (S110–S112).

Figure 4:
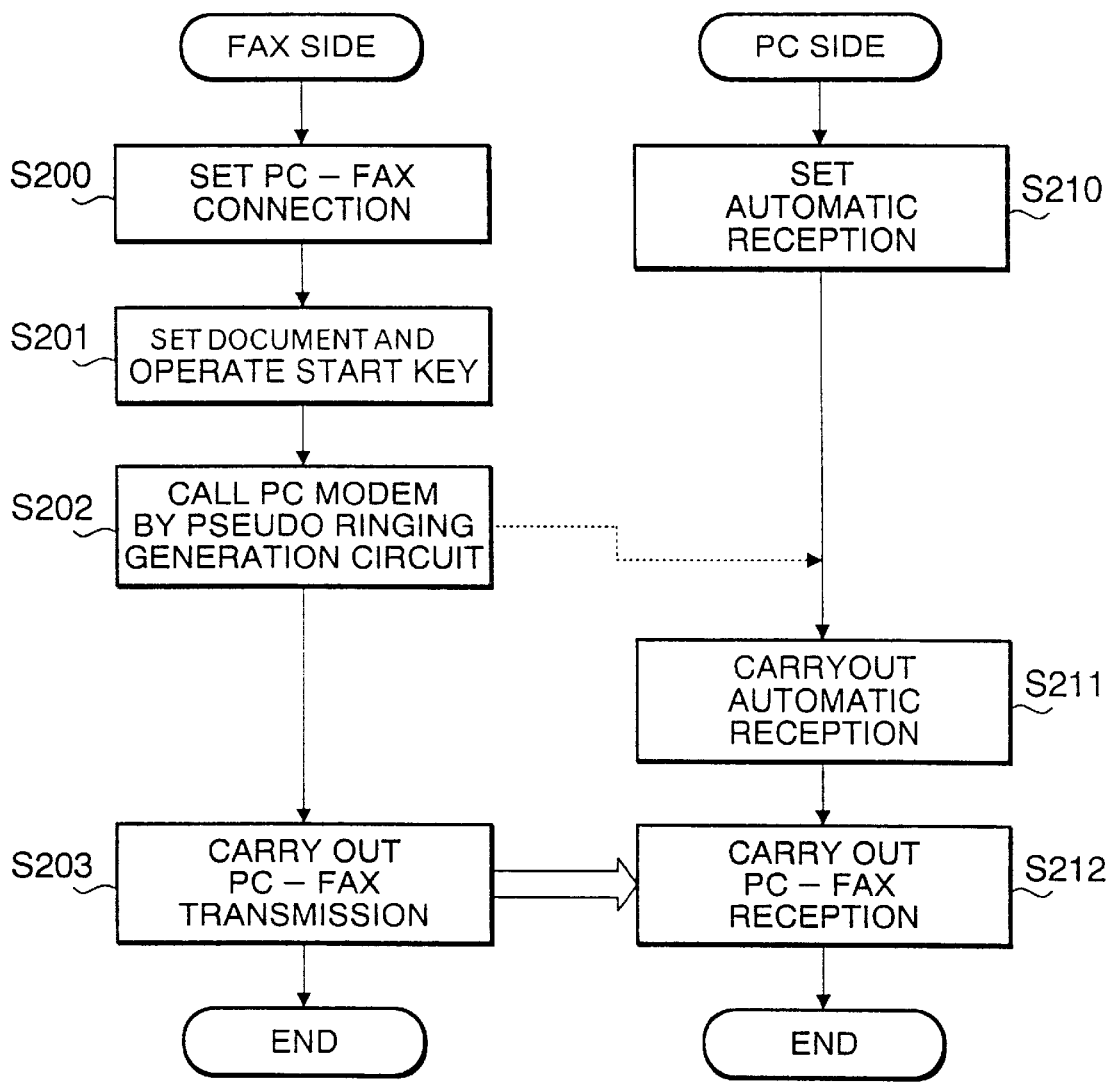
FIG. 4 is a flow chart showing an example of operation during the PC scanning.

Next, another operation for the PC scanning process will be described with reference to the schematic flow charts shown in Figure 4. In Figure 4, the operation on the facsimile device 1 side (S200–S203) and that on the PC2 side (S210–S212) are both shown such that they correspond to each other in the flow charts.

At the facsimile device 1, after setting by key operation or the like the data transmission process (PC scanning) for transmitting data to the PC 2, the document to be transmitted is set at the scanner 17 and the start key of the operation part 18 is operated. Then, a pseudo ringing signal is generated by the pseudo ringing generation circuit 14 and the PC modem 21 is called by way of the communication link C. The called PC 2 is automatically connected to the facsimile device 1 and receives the data from the PC modem 21 since the PC2 is set in the automatic reception mode.

In this state, the scanned image data of the document can be transmitted from the fax modem 11 of the facsimile device 1 to the PC modem 21 of the PC 2 over communication link C according to the facsimile communication procedure.

In short, PC scanning can be carried out by calling from the facsimile device 1 side. Further, the PC modem 21 can perform automatic reception of the transmitted data by the pseudo ringing generation circuit 14's generation of the pseudo ringing signal and transmission of the signal to the PC side 2.

As understood from the description above, the communication terminal device of the present invention can determine which data processing (data reception or data transmission) is to be performed and can then automatically carry out the determined processing by simply receiving predetermined signals from the external terminal device connected to the communication terminal device over the communication link. Due to this, operativity and maneuverability of the device is significantly enhanced.

Therefore, when the facsimile device (the communication terminal device) is connected with the PC (the external terminal device), no operation is required on the facsimile device side during PC printing or PC scanning because the facsimile device is able to recognize and discern the signals transmitted from the PC side and automatically carry out the necessary operations according to the discerned signal.

Further, by transmitting the ringing signals from the communication terminal device, the external terminal device can be made to automatically receive the data that is transmitted from the communication terminal device during the data transmission process. Thus, when the facsimile device is connected to the PC as described above, only the facsimile device need be operated in order to carry out PC scanning.

Further, the pseudo ringing signal can be used as the ringing signal to be transmitted to the external terminal device over the communication link. Consequently, since a conventional ringing generation circuit can be used, automatic reception by the external device can be enabled using a relatively simple construction.

What is claimed is:

1. A communication terminal device adapted to be connected to an outside line and an external terminal unit via a communication link, comprising:

means for feeding voltage to the communication link;

means for detecting off-hooking of the external terminal unit;

first switching means for disconnecting the communication link from the voltage feed means and connecting it to a modem of the communication terminal device after the off-hook detection means detects the off-hooking, and wherein reception of data from the external terminal unit is enabled when a signal received by the modem via the communication link from the external terminal unit is a calling signal, and transmission of data to the external terminal is enabled when the signal is a reception-response signal;

second switching means for connecting the external terminal unit to the outside line , means for feeding a pseudo bell signal to the external terminal unit; and means for scanning an original document, and wherein an image signal is transferred to the external terminal unit from the scanning means via the modem and communication link when the off-hook detection means detects the off-hooking in response to the pseudo bell signal, wherein communication is enabled between the communication terminal device and external terminal unit when a predetermined dialing signal from the external unit is detected, and the second switching means causes the external terminal unit to connect to the outside line when the predetermined dialing signal is not detected.

2. A communication terminal device of claim 1, wherein the off-hook detection means detects a dialing pulse if the predetermined dialing signal is a dialing pulse.

3. A communication terminal device of claim 1, wherein the modem detects DTMF if the predetermined dialing signal is DTMF.

* * * * *